(12) United States Patent
Mitsuishi et al.

(10) Patent No.: US 7,981,471 B2
(45) Date of Patent: Jul. 19, 2011

(54) PROCESSES FOR PRODUCING THIN FILMS AND OPTICAL MEMBERS

(75) Inventors: Takeshi Mitsuishi, Tokyo (JP);
Terufumi Hamamoto, Tokyo (JP);
Ken-ichi Shinde, Tokyo (JP)

(73) Assignee: Hoya Corporation, Tokyo (JP)

( * ) Notice: Subject to any disclaimer, the term of this patent is extended or adjusted under 35 U.S.C. 154(b) by 1096 days.

(21) Appl. No.: 11/750,580

(22) Filed: May 18, 2007

(65) Prior Publication Data

US 2008/0286457 A1 Nov. 20, 2008

(51) Int. Cl.
*C23C 16/00* (2006.01)
*B05D 5/06* (2006.01)

(52) U.S. Cl. ..................................... 427/248.1; 427/294

(58) Field of Classification Search ........................ None
See application file for complete search history.

(56) References Cited

U.S. PATENT DOCUMENTS

| 6,359,383 | B1 * | 3/2002 | Chuang et al. | 313/496 |
|---|---|---|---|---|
| 2002/0001168 | A1 * | 1/2002 | Ohata et al. | 361/523 |
| 2003/0029357 | A1 | 2/2003 | Wang | |
| 2003/0071257 | A1 * | 4/2003 | Kang et al. | 257/10 |
| 2003/0127756 | A1 * | 7/2003 | Arai | 264/1.32 |
| 2003/0181044 | A1 * | 9/2003 | Takahashi et al. | 438/689 |
| 2004/0151918 | A9 * | 8/2004 | Mitsuishi et al. | 428/447 |
| 2007/0111628 | A1 * | 5/2007 | Yagi et al. | 445/24 |

FOREIGN PATENT DOCUMENTS

| EP | 1074859 A2 | 2/2001 |
|---|---|---|
| EP | 1300433 A2 | 4/2003 |
| EP | 0 834 092 B1 | 10/2003 |
| JP | 11-310869 | 11/1999 |
| JP | 2002-329598 | 11/2002 |
| JP | 2007-056314 | 3/2007 |
| WO | WO2004/100202 | * 11/2004 |

OTHER PUBLICATIONS

Tomonori, JP11-310869, Nov. 1999; English translation of complete application (JP version provided by applicants).*
Extended European Search Report for Application No. EP 07 01 0277, dated Nov. 12, 2007.

* cited by examiner

*Primary Examiner* — Timothy H Meeks
*Assistant Examiner* — Joseph Miller, Jr.
(74) *Attorney, Agent, or Firm* — Antonelli, Terry, Stout & Kraus, LLP.

(57) ABSTRACT

A process for producing a thin film and an optical member which are free from discoloration of a lens and exhibit a good antistatic property and a good water repellency. The thin film is formed by a vacuum deposition of a water repellent solution which contains (a) a water repellent having a perfluoroalkyl group, (b) a mixture of a silane coupling agent, a modified silicone oil introduced with an organic group into its side chain and/or both terminal ends, and a perfluoroether compound, and (c) at least one conductive substance selected from the group consisting of fullerenes, carbon nanotubes and graphite compounds.

13 Claims, No Drawings

PROCESSES FOR PRODUCING THIN FILMS AND OPTICAL MEMBERS

BACKGROUND OF THE INVENTION

1. Field of the Invention

The present invention relates to a process for producing thin films and optical members, and more particularly to a process for producing thin films and optical members which are free from discoloration of lens and exhibit a good antistatic property and a good water repellency.

2. Description of the Prior Art

There are conventionally known optical members constituted of a plastic substrate and an anti-reflection film which is formed on the substrate by vapor-depositing an inorganic substance, etc. Such optical members are excellent in antireflection property and scratch resistance. However, the optical members having such an anti-reflection film are insufficient in antistatic property the substrate is plastic. As a method to solve this problem, it is known to successively form a hard coat layer and an antistatic hard coat layer on the plastic substrate (JP 2002-329598A). It is further known that an optical thin film made of a conductive metal oxide obtained by reacting a metal with an unfixed amount of oxygen is introduced into anti-reflection films to impart the antistatic property to the optical member (EP 0834092A). In addition, there is known a process for producing a thin film in which a thin film-forming material composed of a water-repellent material added with a conductive substance such as a carbon paste is evaporated by an electron gun (JP 11-310869A).

However, the antistatic hard coat layer described in JP 2002-329598A, etc., is satisfactory in the antistatic effect, but absorbs visible light largely and discolors lens. The optical member described in EP 0834092A, etc., is satisfactory in the antistatic effect, but its surface is poor in the scratch resistance. Further, in the process for producing a thin film as described in JP 11-310869A, although a water-repellent film is stably produced using an electron gun because the raw water-repellent material contains a conductive substance, the antistatic effect is insufficient. If the power of the electron gun for evaporation of the thin film-forming material is increased to impart the antistatic effect, the antistatic effect is made uneven over the surface of lens. Thus, the process is still unsatisfactory for the antistatic effect of the thin film.

SUMMARY OF THE INVENTION

The present invention has been made in view of solving the above problems. An object of the present invention is to provide a process for producing a thin film and an optical member which are free from discoloration of lens and exhibit a good antistatic property and a good water repellency.

As a result of extensive researches for solving the above problems, the inventors have found that the above object is achieved by forming a thin film by a vacuum deposition method using a water repellent solution prepared by mixing (a) a water repellent having a perfluoroalkyl group, (b) a mixture of a silane coupling agent, a modified silicone oil introduced with an organic group into its side chain and/or both terminal ends, and a perfluoroether compound, and (c) at least one conductive substance selected from the group consisting of fullerenes, carbon nanotubes and graphite compounds. The present invention has been accomplished on the basis of this finding.

Thus, the present invention provides a process for producing a thin film by a vacuum deposition method using a water repellent solution, the water repellent solution being prepared by mixing (a) a water repellent having a perfluoroalkyl group, (b) a mixture of a silane coupling agent, a modified silicone oil introduced with an organic group into its side chain and/or both terminal ends, and a perfluoroether compound, and (c) at least one conductive substance selected from the group consisting of fullerenes, carbon nanotubes and graphite compounds.

The present invention further provides a process for producing an optical member, including a step of forming a multilayer anti-reflection film on an optical substrate and a step of forming a thin film on the multilayer anti-reflection film by the process for producing a thin film mentioned above.

DETAILED DESCRIPTION OF THE INVENTION

In the process for producing a thin film according to the present invention, a water repellent solution prepared by mixing (a) a water repellent having a perfluoroalkyl group, (b) a mixture of a silane coupling agent, a modified silicone oil introduced with an organic group into its side chain and/or both terminal ends, and a perfluoroether compound, and (c) at least one conductive substance selected from the group consisting of fullerenes, carbon nanotubes and graphite compounds is subjected to vacuum deposition to form the thin film.

Also, in the process for producing an optical member according to the present invention, a multilayer anti-reflection film is formed on an optical substrate, and then, a thin film is further formed on the multilayer anti-reflection film by the above process for producing a thin film according to the present invention.

The water repellent (a) having a perfluoroalkyl group is not particularly limited as long as it is water-repellent and oil-repellent. Examples of the water repellent include those described in JP 61-130902A, JP 58-172246A, JP 58-122979A, JP 58-172242A, JP 60-40254A, JP 50-6615A, JP 60-221470A, JP 62-148902A, JP 9-157582A, JP 9-202648A and JP 9-263728A. The number of carbon atoms of the perfluoroalkyl group is preferably from 1 to 100 and more preferably from 5 to 20.

Specific examples of the water repellent having a perfluoroalkyl group include the following compounds.

Compounds represented by the following formula I:

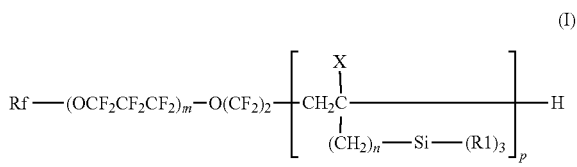

(I)

wherein Rf is a linear perfluoroalkyl group having from 1 to 16 carbon atoms (the alkyl group includes, for example, methyl, ethyl, n-propyl, isopropyl and n-butyl); X is a hydrogen atom or a lower alkyl group having from 1 to 5 carbon atoms such as methyl, ethyl, n-propyl, isopropyl and n-butyl; R1 is a hydrolyzable group such as an amino group and an alkoxy group or a halogen atom such as fluorine, chlorine, bromine and iodine; m is an integer of from 1 to 50, preferably from 1 to 30; n is an integer of from 0 to 2, preferably 1 or 2; and p is an integer of from 1 to 10, preferably from 1 to 8.

Compounds represented by the following formula II:

$$C_qF_{2q+1}CH_2CH_2Si(NH_2)_3 \qquad (II)$$

wherein q is an integer of 1 or more and preferably from 2 to 20.

Examples of the compounds of the formula II include n-trifluoro(1,1,2,2-tetrahydro)propylsilazane (n-CF$_3$CH$_2$CH$_2$Si(NH$_2$)$_3$), n-heptafluoro(1,1,2,2-tetrahydro)pentylsilazane (n-C$_3$F$_7$CH$_2$CH$_2$Si(NH$_2$)$_3$), n-nonafluoro (1,1,2,2-tetrahydro)hexylsilazane (n-C$_4$F$_9$CH$_2$CH$_2$Si (NH$_2$)$_3$), n-tridecafluoro(1,1,2,2-tetrahydro)octylsilazane (n-C$_6$F$_{13}$CH$_2$CH$_2$Si(NH$_2$)$_3$) and n-heptadecafluoro(1,1,2,2-tetrahydro)decylsilazane (n-C$_8$F$_{17}$CH$_2$CH$_2$Si(NH$_2$)$_3$).

Compounds represented by the following formula III:

(III)

wherein q' is an integer of 1 or more and preferably from 1 to 20.

Examples of the compounds of the formula III include 2-(perfluorooctyl)ethyl trimethoxysilane (n-C$_8$F$_{17}$CH$_2$CH$_2$Si(OCH$_3$)$_3$).

Compounds represented by the following formula IV:

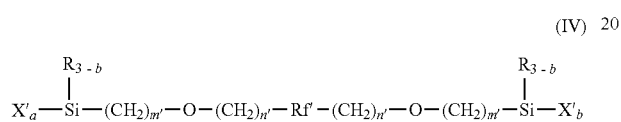
(IV)

wherein Rf' is a divalent linear oxyperfluoroalkylene group represented by the formula: —(C$_k$F$_{2k}$)O— wherein k is an integer of from 1 to 6; R groups are each independently a monovalent hydrocarbon group having from 1 to 8 carbon atoms such as methyl, ethyl, n-propyl, isopropyl and n-butyl; X' groups are each independently a hydrolyzable group such as an amino group and an alkoxy group or a halogen atom such as fluorine, chlorine, bromine and iodine; subscripts n' are each independently an integer of from 0 to 2 and preferably 1 or 2; subscripts m' are each independently an integer of from 1 to 5 and preferably 1 or 2; and subscripts a and b are each independently an integer of 2 or 3.

Preferred examples of the commercially available water repellent having a perfluoroalkyl group include "KP801M" (tradename; available from Shin-Etsu Chemical Co., Ltd.), "KY130" (tradename; available from Shin-Etsu Chemical Co., Ltd.), "X-71-130" (tradename; available from Shin-Etsu Chemical Co., Ltd.) and "Optool DSX" (tradename; available from Daikin Industries, Ltd.).

The content of the component (a) in the water repellent solution is preferably from 30 to 90% by weight and more preferably from 35 to 80% by weight on the basis of the total weight of the components (a) to (c).

The component (b) is a mixture of a silane coupling agent, a modified silicone oil introduced with an organic group into its side chain and/or both terminal ends and a perfluoroether compound, and serves for ensuring the thickness of the resultant water-repellent film. Unlike the conventional water-repellent layers, a sufficient thickness of the water-repellent film is ensured by the use of the component (b). Since the increase in the thickness of the water-repellent film leads to the increase in the content of the conductive substance (component (c)) in the thin film, the antistatic property and durability are consequently improved.

Preferred silane coupling agents for the component (b) are represented by the following formula V:

(V)

wherein R$^1$ is a monovalent hydrocarbon group having from 1 to 20 carbon atoms which may have a functional group; R$^2$ is an alkyl group having from 1 to 8 carbon atoms, an aryl group having from 6 to 10 carbon atoms, an aralkyl group having from 7 to 10 carbon atoms or an acyl group having from 2 to 10 carbon atoms; and n is 0, 1 or 2, with the proviso that a plurality of R$^1$ groups may be the same or different and a plurality of R$^2$O groups may be the same or different.

Of these silane coupling agents, preferred are aminopropyltrialkoxysilanes such as aminopropyltrimethoxysilane and aminopropyltriethoxysilane.

The following compounds represented by the following formulae (VI) and (VII) are preferably used as the modified silicone oil introduced with an organic group into its side chain and/or both terminal ends for the component (b).

Side chain-modified silicone oil prepared by introducing an organic group into a part of side chains of polysiloxane represented by the following formula VI:

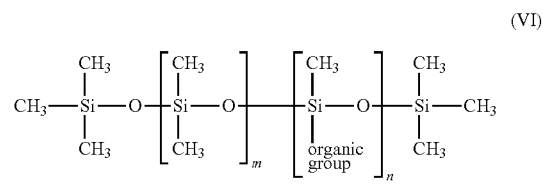
(VI)

wherein m and n are each independently an integer of 1 or more; "organic group" is a modifying group selected from the group consisting of —RNHR'NH$_2$ (amino-modification), —RNH$_2$ (amino-modification),

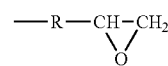

(epoxy-modification),

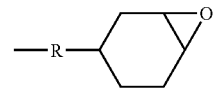

(epoxy-modification), —RCOOH (carboxyl-modification), —ROH (carbinol-modification), —RSH (mercapto-modification), epoxy group/polyether group (different functionality modification), and amino group/polyether group (different functionality modification), with the proviso that when n is an integer of 2 or more, two or more organic groups may be the same or different; R is a hydrocarbon group having from 1 to 10 carbon atoms; and R' is a hydrocarbon group having from 1 to 10 carbon atoms.

Terminal end-modified silicone oil prepared by introducing organic groups into both terminal ends represented by the following formula VII:

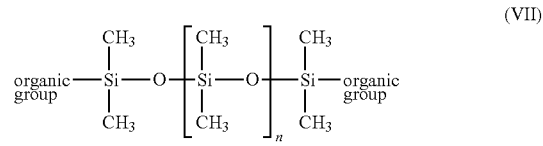
(VII)

wherein n is an integer of 1 or more; two "organic groups" may the same or different and are each independently a modi fying group selected from the group consisting of —RNH2 (amino-modification),

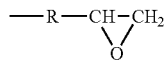

(epoxy-modification),

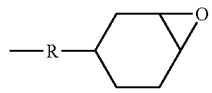

(epoxy-modification), —RCOOH (carboxyl-modification), —ROH (carbinol-modification),

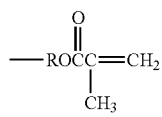

(methacryl-modification), —RSH (mercapto-modification),

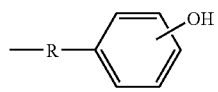

(phenol-modification), and —R(C$_2$H$_4$O)$_a$(C$_3$H$_6$O)$_b$H (polyether-modification); R is a hydrocarbon group having from 1 to 10 carbon atoms; a is an integer of from 1 to 6; and b is an integer of from 1 to 6.

Of these modified silicone oils, preferred are epoxy-modified silicone oils.

As the perfluoroether compound, preferred are compounds represented by the following formula VIII:

$$C_nF_{2n+1}OC_{n'}H_{2n'+1} \tag{VIII}$$

wherein n and n' are each independently an integer of 1 or more.

Preferred examples of the perfluoroether compounds include perfluorobutyl ether, methyl perfluorobutyl ether, butyl perfluoromethyl ether and propyl perfluoroethyl ether.

The content of the component (b) in the water repellent solution is preferably from 9.5 to 69.5% by weight and more preferably from 18.5 to 50% by weight on the basis of the total weight of the components (a) to (c). The weight ratio of the component (b) to the component (a) (b/a) is preferably from 0.7 to 1.1.

The weight ratio of the silane coupling agent and the modified silicone oil is preferably from 1:3 to 3:1. The amount of the perfluoroether compound used is preferably from 0.1 to 0.8 part by weight per 1 part by weight of the sum of the silane coupling agent and the modified silicone oil.

The component (c) is at least one conductive substance selected from the group consisting of fullerenes, carbon nanotubes and graphite compounds. The fullerene is at least one compound selected from the group consisting of Cz compounds (z is an integer of from 60 to 120 and preferably from 60 to 95) having a spherical structure or a soccer ball structure and derivatives thereof, and preferably C$_{60}$ fullerene, C$_{72}$ fullerene and derivatives thereof. Specific examples of the fullerenes include C$_{60}$H$_{60}$, C$_{60}$H$_2$, C$_{60}$HBr, C$_{60}$(CH$_3$)$_2$, C$_{60}$H(OH), C$_{60}$H(NH$_2$), C$_{60}$(CN)$_2$, and compounds represented by the following formulae IX, X and XI.

Compounds of Formula IX:

X=CH$_2$: 3'H-cyclopropa[1,9](C$_{60}$-I$_h$)[5,6]fullerene;
X=CHBr: 3'-bromo-3'H-cyclopropa[1,9](C$_{60}$-I$_h$)[5,6]fullerene;
X=O: oxyleno[1,9](C$_{60}$-I$_h$)[5,6]fullerene; and
X=NH: 1'H-azuleno[1,9](C$_{60}$-I$_h$)[5,6]fullerene.

Compound of Formula X:

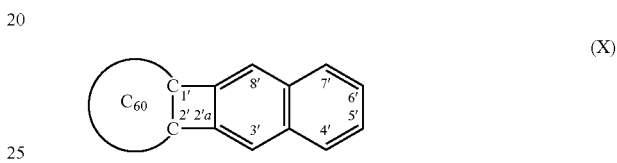

cyclobuta[b]naphthaleno[1',2':1,9](C$_{60}$-I$_h$)[5,6]fullerene).

Compounds of Formula XI:

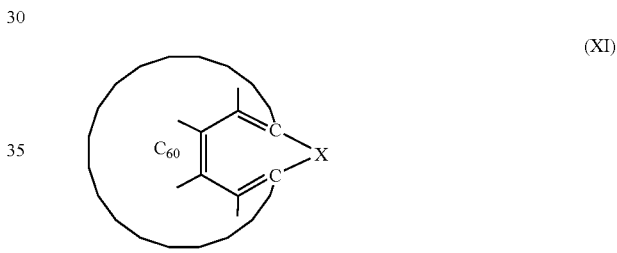

X=CH$_2$: 1(2)a-homo(C$_{60}$-I$_h$)[5,6]fullerene;
X=O: 1a-oxa-1(2)a-homo(C$_{60}$-I$_h$)[5,6]fullerene; and
X=NH: 1aH-1a-aza-1(2)a-homo(C$_{60}$-I$_h$)[5,6]fullerene.

In the above compounds, C$_{60}$ may be C$_{70}$. The above compounds are named according to IUPAC 2002 Fused Ring Nomenclature.

The carbon nanotube (CNT) used as the component (c) has a single-layer or multi-layer coaxial tubular structure of a six-membered ring network made of carbon atoms (graphene sheet). The single-layer type is called a single-walled nanotube (SWNT) and the multi-layer type is called a multi-walled nanotube (MWNT). The double-layer type is called double-walled nanotube (DWNT). In the present invention, preferred are SWNT and DWNT.

The graphite compounds for the component (c) are compounds having a graphite structure. Examples thereof include carbon graphite (graphite), fluorinated graphite and expanded graphite. The carbon graphite (graphite) is known as one of carbon allotropes and has a layered structure of flat layers of two-dimensionally arranged benzene rings. Adjacent flat layers are connected together by van der Walls force and one is superposed on the other in a slightly offset manner. The fluorinated graphite is a fluoride of the carbon graphite. The expanded graphite is produced by chemically treating natural scale graphite and is flame-retardant.

In the present invention, it is preferred to regulate the particle size of commercially available fullerenes, carbon nanotubes and graphite compounds by an automatic mortar. The particle size is regulated to preferably 80 μm or smaller, more preferably 50 μm or smaller and still more preferably from 20 to 50 μm. When the particle size is 20 μm or larger, the secondary aggregation of particles is avoided. When the particle size is 80 μm or smaller, the affinity to a surfactant (dispersant) is good and the occurrence of residual carbons is prevented during the injection of chips. To regulate the particle size within the above range, the stirring speed of the automatic mortar is preferably 100 rpm or less and more preferably from 50 to 100 rpm. The stirring time is generally 60 min or shorter and preferably from 20 to 60 min.

The content of the component (c) in the water repellent solution is preferably from 0.5 to 30% by weight and more preferably from 1.5 to 15% by weight.

In addition to the components (a) to (c), the water repellent solution may further contain a solvent, a silicon-free perfluoropolyether, etc. Examples of the solvent include fluorine solvents such as m-xylene hexafluoride.

As the silicon-free perfluoropolyether (PFPE), there may be used compounds having various structures. Examples thereof include polyethers having a constitutional unit represented by the following formula XII:

—(R'O)— (XII)

wherein R' is a perfluoroalkylene group having 1 to 3 carbon atoms.

The weight-average molecular weight is preferably from 1000 to 10000 and more preferably from 2000 to 10000. Specific examples of R' include $CF_2$, $CF_2CF_2$, $CF_2$, $CF_2CF_2$ and $CF(CF_3)CF_2$. These PFPEs are liquid at ordinary temperature and called fluorine oil.

Examples of the commercially available PFPE include Demnum (tradename) Series (S-20 (average molecular weight: 2700), S-65 (average molecular weight: 4500), S-100 (average molecular weight: 5600) and S-200 (average molecular weight: 8400) available from Daikin Industries, Ltd.; Barrierta (tradename) Series available from NOK Cluver Co., Ltd.; Fomblin (tradename) Series available from Asahi Glass Company Ltd.; Krytox (tradename) Series available from E. I. Du Pont de Nemours and Company; and Molykote HF-30 Oil (tradename) available from Dow Corning Corporation.

The components for the water repellent solution are preferably mixed with one another under stirring. The stirring speed is preferably from 200 to 1000 rpm, and the stirring time is preferably from 2 min to 24 h. The water repellent solution is preferably produced by the procedure described in Table 1 below. The amount of each raw material to be used may be appropriately increased or decreased according to the requirements.

The thin film of the present invention is formed by a vacuum deposition method. To enhance the film strength and the adhesion between the thin film and the substrate, it is preferred to carry out the pretreatment before the film formation by using an ion gun, a plasma gun, etc.

Any of an electron gun, a halogen heater, a resistance heater and a ceramic heater may be used as the heating source for the film formation, with the electron gun being preferred.

Although the water repellent solution may be directly placed in a container and heated, preferably impregnated into a porous material because a uniform deposition film is obtained in many cases. As the porous material, there may be suitably used a sintered filter obtained by sintering a metal powder having a high heat conductivity such as copper and stainless steel. More specifically, the thin film is preferably formed by heating a porous sintered filter impregnated with the water repellent solution in vacuum. The mesh size of the porous material is preferably from 40 to 200 μm and more preferably from 80 to 120 μm because an adequate deposition speed is obtained.

In the present invention, the water repellent solution is preferably vapor-deposited on a substrate or an anti-reflection film formed on the substrate by a heating vapor deposition method in which a raw material is vapor-deposited by heating under reduced pressure. The vacuum degree of a vacuum deposition apparatus is not particularly limited, and is preferably from $1.33 \times 10^{-1}$ to $1.33 \times 10^{-6}$ Pa ($10^{-3}$ to $10^{-8}$ Torr) and more preferably from $6.66 \times 10^{-1}$ to $8.00 \times 10^{-4}$ Pa ($5.0 \times 10^{-3}$ to $6.0 \times 10^{-6}$ Torr) in view of obtaining a uniform water-repellent film.

The temperature for heating the water repellent solution may vary depending upon the kinds of the components (a) to (c) and the vacuum conditions for the vapor deposition, and is preferably in the range of from a vapor deposition initiation temperature of the components (a) to (c) at a vacuum degree employed to a decomposition temperature of the components (a) to (c). The vapor deposition initiation temperature is the temperature at which the vapor pressure of a solution containing the components (a) to (c) is equal to the vacuum degree. The decomposition temperature is the temperature at which 50% of the components (a) to (c) is decomposed for 1 min (measured in a nitrogen atmosphere containing no substance reactive with the components (a) to (c)).

The vapor deposition speed of the water repellent solution is preferably from 4 to 7 nm/min. To achieve such a vapor deposition speed, a method of irradiating the water repellent solution with electron beam is preferably used. The electron beam may be generated by an electron gun conventionally used in an ordinary vapor deposition apparatus. Using an electron gun, the water repellent solution is uniformly irradiated with energy in its entirety to facilitate the formation of a uniform water-repellent film. The power of the electron gun may vary depending upon substances used, vapor deposition apparatus, vacuum degree and irradiation area, and the acceleration voltage is preferably about 6 kV and the applied current is preferably from about 5 to about 80 mA.

The substrate for the optical member of the present invention is not particularly limited. Examples thereof include a plastic optical substrate made of methyl methacrylate homopolymer, methyl methacrylate copolymers, diethylene glycol bis(allyl carbonate) homopolymer, diethylene glycol bis(allyl carbonate) copolymers, sulfur-containing copolymers, halogen-containing copolymers, polycarbonate, polystyrene, polyvinyl chloride, unsaturated polyesters, polyethylene terephthalate, or polyurethanes, and an optical substrate made of inorganic glass. The optical substrate may have a hard coat layer thereon. The hard coat layer may be a cured film containing an organosilicon compound, an acrylic compound, etc.

Examples of the anti-reflection film (vapor-deposited film) which is formed on the optical substrate include a single- or multi-layer film made of $ZrO_2$, $SiO_2$, $TiO_2$, $Ta_2O_5$, $Y_2O_3$, $MgF_2$, $Al_2O_3$, etc., which is used for reducing the reflection of light on the surface of optical substrate such as lens, and a colored film made of $CrO_2$, etc. The outermost layer of the anti-reflection film is preferably a layer mainly made of silicon dioxide. The words "a layer mainly made of silicon dioxide" mean a layer substantially made of silicon dioxide or a hybrid layer made of silicon dioxide, aluminum oxide and an organic compound.

A preferred layer structure of the anti-reflection film is constructed by the following 7 layers from the substrate side to the surface facing to surrounding air.

First Layer: vapor-deposited hybrid layer formed from a raw material composed of an organosilicon compound which is liquid at ordinary temperature and pressure and/or a silicon-free organic compound which is liquid at ordinary temperature and pressure, and an inorganic substance containing silicon dioxide.

Second Layer: layer containing tantalum in an amount of at least 50% by weight.

Third Layer: vapor-deposited hybrid layer formed from a raw material composed of an organosilicon compound which is liquid at ordinary temperature and pressure and/or a silicon-free organic compound which is liquid at ordinary temperature and pressure, and an inorganic substance containing silicon dioxide.

Fourth Layer: layer containing tantalum in an amount of at least 50% by weight.

Fifth Layer: vapor-deposited hybrid layer formed from a raw material composed of an organosilicon compound which is liquid at ordinary temperature and pressure and/or a silicon-free organic compound which is liquid at ordinary temperature and pressure, and an inorganic substance containing silicon dioxide.

Sixth Layer: layer containing tantalum in an amount of at least 50% by weight.

Seventh Layer: vapor-deposited hybrid layer formed from a raw material composed of an organosilicon compound which is liquid at ordinary temperature and pressure and/or a silicon-free organic compound which is liquid at ordinary temperature and pressure, and an inorganic substance containing silicon dioxide.

Examples of the organosilicon compound used in the anti-reflection film include compounds represented by the following formulae A to D.

Silane or Siloxane Compounds of the Formula A:

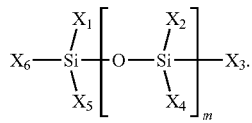

Silazane Compounds of the Formula B:

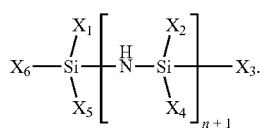

Cyclosiloxane Compounds of the Formula C:

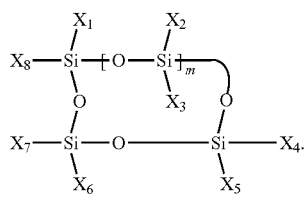

Cyclosilazane Compounds of the Formula D:

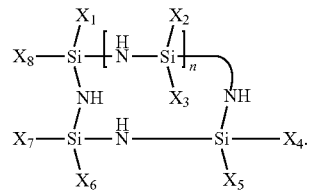

In the formulae A to D, m and n are each independently an integer of 0 or more; and $X_1$ to $X_8$ are each independently a hydrogen atom, a hydrocarbon group having 1 to 6 carbon atoms (inclusive of saturated and unsaturated hydrocarbon groups), $-OR^1$, $-CH_2OR^2$, $-COOR^3$, $-OCOR^4$, $-SR^5$, $-CH_2SR^6$, $-NR^7_2$ or $-CH_2NR^8_2$ wherein $R^1$ to $R^8$ are respectively a hydrogen atom or a hydrocarbon group having 1 to 6 carbon atoms (inclusive of saturated and unsaturated hydrocarbon groups). Examples of the hydrocarbon groups as $X_1$ to $X_8$ and $R^1$ to $R^8$ include methyl, ethyl, n-propyl, isopropyl and n-butyl.

Examples of the silicon-free organic compound used in the anti-reflection film include compounds represented by the following formulae E to G:

Mono-Epoxy-Terminated Silicon-Free Organic Compounds of the Formula E:

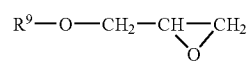

which include carbon and hydrogen as essential components.

Di-Epoxy-Terminated Silicon-Free Organic Compounds of the Formula F:

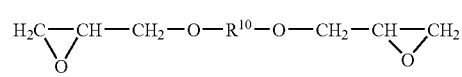

which include carbon and hydrogen as essential components.

Unsaturated Silicon-Free Organic Compounds of the Formula G:

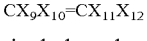

which include carbon and hydrogen as essential components.

In the formulae E and F, $R^9$ is a hydrogen atom or a hydrocarbon group having 1 to 10 carbon atoms which may include oxygen and $R^{10}$ is a divalent hydrocarbon group having 1 to 7 carbon atoms which may include oxygen.

In the formula G, $X_9$ to $X_{12}$ are each independently a hydrogen atom, a hydrocarbon group having 1 to 10 carbon atoms, or an organic group having 1 to 10 carbon atoms which include carbon atom and hydrogen atom as essential components and further include at least one of oxygen atom and nitrogen atom as an essential component. Examples of the hydrocarbon groups as $R^9$ and $X_9$ to $X_{12}$ include methyl, ethyl, n-propyl, isopropyl and n-butyl.

Examples of the divalent hydrocarbon group as $R^{10}$ include methylene, ethylene, n-propylene, isopropylene and n-butylene.

Examples of the organic groups as $X_9$ to $X_{12}$ include an amino group, an epoxy group, a carboxyl group and a polyether group.

The optical member produced by the process of the present invention is preferably a plastic lens.

The present invention is described in more detail by referring to the following examples. However, it should be noted that these examples are only illustrative and not intended to limit the invention thereto.

The properties of the optical members obtained in the following examples and comparative examples were evaluated by the following methods.

(1) Luminous Transmittance Y

The luminous transmittance Y of a plastic lens having an anti-reflection film on both surfaces was measured by Hitachi Spectrophotometers "U-4100" and "U-3410".

(2) Luminous Reflectance Z

The luminous reflectance Z of a plastic lens having an anti-reflection film on both surfaces was measured by Hitachi Spectrophotometers "U-4100" and "U-3410".

(3) Impact Resistance

A lens having a central thickness (CT) of 1.0 mm or 2.0 mm and a refractive power of 0.00 D (diopter) was produced and subjected to a drop ball test prescribed by FDA (Food and Drug Administration). The results were evaluated according to the following ratings.

A: Accepted

B: Rejected

The weight of the ball was 16 g. The lens suffered from cracks or fracture after the drop ball test was made "rejected," and the lens exhibiting no change in the appearance even after the drop ball test was made "accepted."

(4) Adhesion Strength

The surface of a plastic lens was cross-cut by a razor to form 100 squares (1 mm×1 mm). Apiece of cellophane tape available from Nichiban Co., Ltd., was attached onto the cross-cut surface, and then, rapidly peeled off. The adhesion strength was evaluated by the rate of the residual squares (the number of residual squares/100).

(5) Abrasion Resistance

The surface of the plastic lens was rubbed with a steel wool (#0000 available from Nihon Steel Wool Co., Ltd.) under a load of 1 kgf/cm² (0.1 MPa) in 10 strokes and then the surface was observed. The results were evaluated according to the following ratings.

UA: Substantially no scores

A: Several thin scores

B: Many thin scores and several thick scores

C: Many thin scores and many thick scores

D: Substantial peeling off of the film (6) Heat Resistance

The plastic lens was heated in a dry oven for 1 h while raising the temperature at intervals of 5° C. from 60° C. to determine the temperature at which cracks occurred.

(7) Alkali Resistance

A plastic lens was immersed in a 10 wt % NaOH aqueous solution at 20° C. for 1 h and then the surface was observed. The results were evaluated according to the following ratings.

UA: Substantially no change

A: Several dot-like peelings

B: Dot-like peelings throughout the surface

C: Dot-like peelings throughout the surface and several scale-like peelings

D: Substantial peeling off of the film (8) Bayer Value

Using a BTE Abrasion Tester (tradename; available from Colts Inc. (US)) and a haze meter available from Murakami Color Research Laboratory Co., Ltd., the difference in haze value between sample lenses and reference lenses was measured to determine the Bayer value.

Number of Samples and Measuring Method (a) Three reference lenses (CR39) and three sample lenses.

(b) Measuring haze values before the abrasion test.

(c) Performing the abrasion test using the BET abrasion tester (600-stroke of abrasion with sand).

(d) Measuring haze values after the abrasion test.

(e) Calculating the Bayer value (average of three lenses) according to the following formula:

Bayer Value=(Change in transmittance of reference lens)/(Change in transmittance of sample lens).

(9) Static Voltage

The convex surface of a plastic lens was hand-rubbed with a tissue paper 100 times to measure the static voltage using a static charge meter "FMX-002" (tradename) available from Simco Japan Co., Ltd. Since the static voltage varied with time, the static voltage was measured at 5 s, 10 s, 20 s, 40 s, 80 s, 160 s and 320 s after rubbed 100 times. The measured values were fitted by the formula: $V_1=V_0\exp(-at)$, wherein $V_1$ is the static voltage (V), $V_0$ is the estimated initial static voltage (V), 1/a is the time (second) required for reaching 1/a of the initial static voltage, and t is time (second) passed before the measurement.

The antistatic effect was evaluated from the results according to the following ratings.

$V_0 \leqq 300$ V and $1/a \leqq 50$ s: Good antistatic effect $V_0 > 300$ V or $1/a > 50$ s: No antistatic effect

(10) Conductivity of Treating Solution (Water Repellent Solution)

The treating solution (0.2 cc) was dropped on a slide glass and then spread into a circle of a diameter of 10 mm. Before dried up, the electric resistance was measured by a tester with a test probe distance of about 5 mm. The conductivity was determined by the measured electric resistance.

The antistatic effect was evaluated according to the following ratings.

Measured resistance was 10 MΩ or less: Sufficient antistatic effect

Measured resistance was more than 10 MΩ: Insufficient antistatic effect

(11) Water Repellency

The water repellency was evaluated by the contact angle of water measured using a contact angle meter available from Kyowa Interface Science Co., Ltd.

Water repellent solutions were prepared from the following raw materials.

Component (a): Water repellent having perfluoroalkyl group

KY130: water repellent available from Shin-Etsu Chemical Co., Ltd.

Component (b): Silane coupling agent, modified silicone oil and perfluoroether compound KBE903: amino group-containing silane coupling agent available from Shin-Etsu Chemical Co., Ltd.

KF101: side chain epoxy-modified silicone oil available from Shin-Etsu Chemical Co., Ltd.

KF105: di-epoxy-terminated, modified silicone oil available from Shin-Etsu Chemical Co., Ltd.

HFE7100: perfluoroether compound available from Sumitomo 3M Limited.

HFE7200: perfluoroether compound available from Sumitomo 3M Limited.

The chemical structurals of the silane coupling agents, modified silicone oils and perfluoroether compounds are shown below.

KBE903: $(C_2H_5O)_3SiC_3H_6NH_2$

KF101:

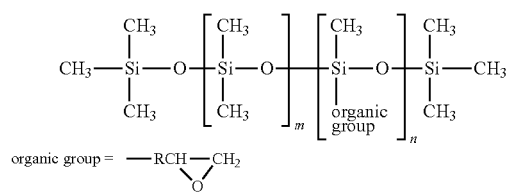

organic group = —RCH—CH$_2$ \\ O /

KF105:

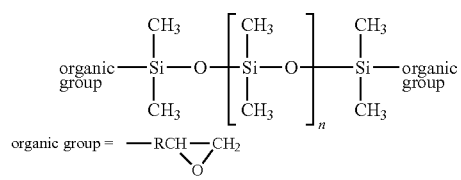

organic group = —RCH—CH$_2$ \\ O /

HFE7100: $C_4F_9OCH_3$
HFE7200: $C_3F_7OC_2H_5$
Component (c): Conductive Substance
CNT: carbon nanotube (original particle size: 2 to 20 nm) available from The Honjo Chemical Corporation.
C60 and 070: carbon clusters (original particle size: 5 nm) available from Kanto Kagaku Co., Ltd.
CBG: conductive carbon black #3855 (original particle size: 24 nm) available from Tokai Carbon Co., Ltd.

These conductive substances were granulated into particles having a particle size of 20 to 50 μm using an automatic mortar.

Production Example 1

1. A glass container placed with a stirrer was charged with 1.0 g of crashed CNT (CBG or C60/C70). The words "CNT (CBG or C60/C70)" means that CBG, or C60 and/or C70 may be used in place of CNT to obtain the same effect.
2. Next, 4 g of KBE903 was charged into the glass container and the contents were stirred for 120 s. The rotating speed of the stirrer was 500 rpm.
3. Next, 4 g of KF105 was introduced into the glass container and the contents were stirred for 24 h to prepare Filler A.
4. After stirring for 120 min, 3.5 g of Filler A was added to 7.0 g of the water repellent KY130 in a separate container and the contents were stirred for 120 s.
5. Then, 3 g of HFE7200 (perfluoroether compound) was added to the glass container and the contents were stirred for 24 h to prepare a treating solution (water repellent solution). The carbon content in the solid component (content of CNT (CBG or C60/C70)) was 7.91% by weight. The above procedure is shown in Table 1 below.

TABLE 1

| Step | Raw materials | Amount used (g) | Mixing time |
|---|---|---|---|
| 1 | Component (c): conductive substance CNT (CBG or C60/C70) | 1.0 | — |
| 2 | Component (b): silane coupling agent KBE903 | 4.0 | 120 s |
| 3 | Component (b): modified silicone oil KF105 | 4.0 | 24 h |

TABLE 1-continued

| Step | Raw materials | Amount used (g) | Mixing time |
|---|---|---|---|
| 4 | Adding Filler A to KY130 (component (a): water repellent) | | 120 s |
| | Filler A | 3.5 | |
| | KY130 | 7.0 | |
| 5 | Component (b): perfluoroether compound HFE7200 | 3.0 | 24 h |

Examples 1-5 and Comparative Examples 1-4

As shown in Tables 2-1/5 to 2-5/5 and Tables 3-1/4 to 3-4/4, each plastic lens having a water-repellent antistatic layer was produced by the following sequential steps:
step 1 of forming a cured film A or B on each of the plastic lens substrates A to D;
step 2 of pretreating the cured film by the irradiation of ions;
step 3 of forming an anti-reflection film composed of 1st to 7th layers on the pretreated film;
step 4 of pretreating the anti-reflection films by the irradiation of ions; and
step 5 of forming a thin film (water-repellent antistatic layer) on the anti-reflection film.

The kinds of materials, production methods and treating methods used in the examples and comparative examples are described below.
Plastic Lens Substrate
Substrate A: diethylene glycol bis(allyl carbonate); refractive index: 1.50; central thickness (CT): 2.0 mm; refractive power: 0.00 D
Substrate B: EYRY substrate (tradename; available from HOYA Corporation; a polymer of an epithio group-containing compound); refractive index: 1.70; CT: 1.0 mm; refractive power: 0.00 D
Substrate C: EYNOA substrate (tradename; available from HOYA Corporation; polythiourethane resin); refractive index: 1.67; CT: 1.0 mm; refractive power: 0.00 D In Example 2, a primer layer was formed between the substrate and the cured film. The primer layer was formed by the following method.

A mixture of 6.65 parts by weight of a polyester polyol "Desmophen A-670" (tradename) available from Sumitomo Bayer Urethane Co., Ltd., 6.08 parts by weight of a block polyisocyanate "BL-3175" (tradename) available from Sumitomo Bayer Urethane Co., Ltd., 0.17 part by weight of dibutyltin dilaurate as a curing catalyst, 0.17 part by weight of a fluorine-containing leveling agent "Fluorad FC-430" (tradename) available from Sumitomo 3M Limited, and 95.71 parts by weight of diacetone alcohol as a solvent were fully stirred until reaching a uniform state. The thus obtained liquid primer was applied onto a plastic lens substrate pretreated with an alkali by a dipping method (lifting speed: 24 cm/min), and cured under heating at 100° C. for 40 min, to form a primer layer having a thickness of 2 to 3 μm.
Step 1: Formation of Cured Film
(1-1) Preparation of Coating Composition A
In an atmosphere of 5° C., 45 parts by weight of a methanol sol of a modified stannic oxide-zirconium oxide-tungsten oxide-silicon oxide composite, 15 parts by weight of γ-glycidoxypropyltrimethoxysilane and 3 parts by weight of tetraethoxysilane were mixed under stirring for 1 h. Thereafter, 4.5 parts by weight of a 0.001 mol/L hydrochloric acid was added and then stirred for 50 h. Next, a mixed solvent of 25 parts by weight of propylene glycol monomethyl ether and 9 parts by weight of diacetone alcohol, 1.8 parts by weight of aluminum tris(acetyl acetonate) and 0.05 part by weight of aluminum perchlorate were sequentially added and then stirred for 150 h. The resultant solution was filtered through a 0.5 μm-mesh filter, to obtain a coating composition A.

(1-2) Formation of Cured Film A

The substrate A mentioned above was dipped in a 10 wt % aqueous solution of sodium hydroxide at 60° C. for 300 s and then washed with ion-exchanged water for 90 s under exposure to ultrasonic wave of 28 kHz. Finally, the substrate was dried at 70° C., to pretreat the substrate A by a series of the steps.

The pretreated substrate A was dipped in the coating composition A for 30 s and then lifted therefrom at a rate of 30 cm/min. The coating composition A on the substrate A was cured at 120° C. for 60 min, to form a cured film A.

(1'-1) Preparation of Coating Composition B

To 100 parts by weight of γ-glycidoxypropyltrimethoxysilane, 1.4 parts by weight of 0.01 mol/L hydrochloric acid and 23 parts by weight of water were added under stirring. The stirring was continued for 24 h to obtain a hydrolyzate of γ-glycidoxypropyltrimethoxysilane. To the hydrolyzate of γ-glycidoxypropyltrimethoxysilane, was added a mixture of 200 parts by weight of a sol of composite fine particles mainly composed of titanium oxide, zirconium oxide and silicon oxide, 100 parts by weight of ethyl cellosolve, 0.5 part by weight of a silicone surfactant and 3.0 parts by weight of aluminum acetylacetonate. The obtained mixture was fully stirred and then filtered, to obtain a coating composition B.

(1'-2) Formation of Cured Film B

Each of the substrate B and C pretreated with an aqueous alkali solution was dipped in the coating composition B for 30 s and then lifted therefrom at a rate of 20 cm/min. The coating composition B on the substrate was cured at 120° C. for 120 min, to form a cured film B.

Step 2: Ion Gun Treatment of Cured Film (Pretreatment)

The cured film was pretreated by the ion irradiation using an ion gun under the ion acceleration voltage, irradiation time and gas atmosphere as described in the following Tables.

Step 3: Formation of Anti-Reflection Film

After the pretreatment by ion irradiation, the anti-reflection film composed of 1st to 7th layers was formed.

The hybrid layer was formed by a binary vapor deposition under the conditions controlled so as to deposit the inorganic substance and the organic substance almost simultaneously. The organic substance was vaporized in an external heating tank, and the vaporized organic substance was introduced into a vapor deposition apparatus through a gas valve and a mass-flow controller. The hybrid layer was formed in an argon-oxygen mixed gas atmosphere by an ion-assisted method.

In the following Tables, CM1 represents an organosilicon compound and CM2 represents a silicon-free organic compound. The organic compounds shown in the Tables are as follows.

Epolight 70P: propylene glycol diglycidyl ether available from Kyoeisha Chemical Co., Ltd. having a molecular weight of about 188.

Denacol EX920: polypropylene glycol diglycidyl ether available from Nagase ChemteX Corporation having a molecular weight of about 300.

Epiol P200: polypropylene glycol glycidyl ether available from NOF Corporation having a molecular weight of about 304.

Step 4: Ion Gun Treatment of Anti-Reflection Film (Pretreatment)

The anti-reflection film was pretreated by the ion irradiation using an ion gun under the ion acceleration voltage, irradiation time and gas atmosphere as shown in the following Tables.

Step 5: Formation of Thin Film (Water-Repellent Antistatic Layer)

First, film-forming chips were produced from the treating solution obtained in Production Example 1 by injecting 0.3 cc of the treating solution into a SUS bio column using a separate injector and drying at room temperature or 80° C. in a dry oven for about 2 h.

The obtained chips were subjected to vacuum deposition using EB (electron gun) to form a thin film on the anti-reflection film under the following film-forming conditions.

Vapor deposition apparatus: "BMC-1050-HP" available from Shincron Co., Ltd.

Film-Forming Conditions

Vacuum degree at beginning: $2 \times 10^{-3}$ Pa

EB output: 20 mA

"Dotite D-550" (tradename) is a silver-based conductive paste available from Fujikura Kasei Co., Ltd., "Dotite XC-12" (tradename) is a carbon-based conductive paste available from Fujikura Kasei Co., Ltd., and "KP801P" is a water repellent available from Shin-Etsu Chemical Co., Ltd., each being used in comparative examples.

The tests (1) to (11) were performed on the plastic lenses having the thin films which were formed in the manner described above. The results are shown in Tables 4-1/2 to 4-2/2.

As shown in Table 4, the treating solutions for plastic lens in Examples 1 to 5 are excellent in the antistatic performance as evidenced by a conductivity of 10 MΩ or less and an initial static voltage of 300 V or less. The water repellency is also excellent as evidence by a water contact angle of 107° or more.

TABLE 2-1/5

| | Example 1 | | |
|---|---|---|---|
| Plastic lens substrate | | Substrate C | |
| Cured film | | Cured film B | |
| Ion gun pretreatment | Conditions | Acceleration voltage: 500 V; Acceleration current: 180 mA; 45 s | |
| | Gas | $O_2$: 10 sccm + Ar: 10 sccm | |
| Anti-reflection film | | | |
| First layer (hybrid layer) | Substance (content) | M1 CM2 | $SiO_2$ Epolight 70P: 10 sccm |
| | Film thickness/refractive index | 0.0352λ/1.478 | |
| | Ion gun | Conditions | Acceleration voltage: 200 V; Acceleration current: 120 mA |
| | | Gas | $O_2$: 10 sccm + Ar: 10 sccm |
| Second layer (high refractive index layer) | Substance | $Ta_2O_5$ | |
| | Film thickness | 0.0236λ | |
| | Ion gun | Conditions | Acceleration voltage: 200 V; Acceleration current: 120 mA |
| | | Gas | $O_2$: 20 sccm |
| Third layer (hybrid layer) | Substance (content) | M1 CM2 | $SiO_2$ Epolight 70P: 10 sccm |
| | Film thickness/refractive index | 0.6084λ/1.478 | |
| | Ion gun | Conditions | Acceleration voltage: 200 V; Acceleration current: 120 mA |
| | | Gas | $O_2$: 10 sccm + Ar: 10 sccm |

TABLE 2-1/5-continued

Example 1

| | | | |
|---|---|---|---|
| Fourth layer (high refractive index layer) | Substance | $Ta_2O_5$ | |
| | Film thickness | $0.1358\lambda$ | |
| | Ion gun | Conditions | Acceleration voltage: 200 V; Acceleration current: 120 mA |
| | | Gas | $O_2$: 20 sccm |
| Fifth layer (hybrid layer) | Substance (content) | M1 CM2 | $SiO_2$ Epolight 70P: 10 sccm |
| | Film thickness/refractive index | | $0.0606\lambda/1.478$ |
| | Ion gun | Conditions | Acceleration voltage: 200 V; Acceleration current: 120 mA |
| | | Gas | $O_2$: 10 sccm + Ar: 10 sccm |
| Sixth layer (high refractive index layer) | Substance | $Ta_2O_5$ | |
| | Film thickness | $0.2520\lambda$ | |
| | Ion gun | Conditions | Acceleration voltage: 230 V; Acceleration current: 130 mA |
| | | Gas | $O_2$: 20 sccm |
| Seventh layer (hybrid layer) | Substance (content) | M1 CM2 | $SiO_2$ Epolight 70P: 10 sccm |
| | Film thickness/refractive index | | $0.2636\lambda/1.478$ |
| | Ion gun | Conditions | Acceleration voltage: 200 V; Acceleration current: 120 mA |
| | | Gas | $O_2$: 10 sccm + Ar: 10 sccm |
| Ion gun pretreatment | Conditions | | Acceleration voltage: 200 V; Acceleration current: 120 mA; 45 s |
| | Gas | | $O_2$: 5 sccm + Ar: 15 sccm |
| Thin film (water-repellent antistatic layer) | Substance | | Treating solution; EB heating |

TABLE 2-2/5

Example 2

| | | | |
|---|---|---|---|
| Plastic lens substrate | | Substrate B | |
| Cured film | | Cured film B | |
| Ion gun pretreatment | Conditions | | Acceleration voltage: 500 V; Acceleration current: 180 mA; 130 s |
| | Gas | | $O_2$: 10 sccm + Ar: 10 sccm |
| Anti-reflection film | | | |
| First layer (hybrid layer) | Substance (content) | M1 CM2 | $SiO_2$ Epolight 70P: 20 sccm |
| | Film thickness/refractive index | | $0.0534\lambda/1.468$ |
| | Ion gun | Conditions | Acceleration voltage: 200 V; Acceleration current: 120 mA |
| | | Gas | $O_2$: 10 sccm + Ar: 10 sccm |
| Second layer (high refractive index layer) | Substance | $Nb_2O_5$ | |
| | Film thickness | $0.0319\lambda$ | |
| | Ion gun | Conditions | Acceleration voltage: 550 V; Acceleration current: 180 mA |
| | | Gas | $O_2$: 20 sccm |
| Third layer (hybrid layer) | Substance (content) | M1 CM2 | $SiO_2$ Epolight 70P: 20 sccm |
| | Film thickness/refractive index | | $0.5452\lambda/1.468$ |
| | Ion gun | Conditions | Acceleration voltage: 200 V; Acceleration current: 120 mA |
| | | Gas | $O_2$: 10 sccm + Ar: 10 sccm |

TABLE 2-2/5-continued

Example 2

| | | | |
|---|---|---|---|
| Fourth layer (high refractive index layer) | Substance | $Nb_2O_5$ | |
| | Film thickness | $0.1001\lambda$ | |
| | Ion gun | Conditions | Acceleration voltage: 550 V; Acceleration current: 180 mA |
| | | Gas | $O_2$: 20 sccm |
| Fifth layer (hybrid layer) | Substance (content) | M1 CM2 | $SiO_2$ Epolight 70P: 20 sccm |
| | Film thickness/refractive index | | $0.1094\lambda/1.468$ |
| | Ion gun | Conditions | Acceleration voltage: 200 V; Acceleration current: 120 mA |
| | | Gas | $O_2$: 10 sccm + Ar: 10 sccm |
| Sixth layer (high refractive index layer) | Substance | $Nb_2O_5$ | |
| | Film thickness | $0.1497\lambda$ | |
| | Ion gun | Conditions | Acceleration voltage: 550 V; Acceleration current: 180 mA |
| | | Gas | $O_2$: 20 sccm |
| Seventh layer (hybrid layer) | Substance (content) | M1 CM2 | $SiO_2$ Epolight 70P: 20 sccm |
| | Film thickness/refractive index | | $0.2892\lambda/1.468$ |
| | Ion gun | Conditions | Acceleration voltage: 200 V; Acceleration current: 120 mA |
| | | Gas | $O_2$: 10 sccm + Ar: 10 sccm |
| Ion gun pretreatment | Conditions | | Acceleration voltage: 200 V; Acceleration current: 120 mA; 45 s |
| | Gas | | $O_2$: 5 sccm + Ar: 15 sccm |
| Thin film (water-repellent antistatic layer) | Substance | | Treating solution; EB heating |

TABLE 2-3/5

Example 3

| | | | |
|---|---|---|---|
| Plastic lens substrate | | Substrate C | |
| Cured film | | Cured film B | |
| Ion gun pretreatment | Conditions | | Acceleration voltage: 500 V; Acceleration current: 180 mA; 45 s |
| | Gas | | $O_2$: 10 sccm + Ar: 10 sccm |
| Anti-reflection film | | | |
| First layer (hybrid layer) | Substance (content) | M1 CM2 | $SiO_2$ Epolight 70P: 10 sccm |
| | Film thickness/refractive index | | $0.0352\lambda/1.478$ |
| | Ion gun | Conditions | Acceleration voltage: 200 V; Acceleration current: 120 mA |
| | | Gas | $O_2$: 10 sccm + Ar: 10 sccm |
| Second layer (high refractive index layer) | Substance | $Ta_2O_5$ | |
| | Film thickness | $0.0236\lambda$ | |
| | Ion gun | Conditions | Acceleration voltage: 200 V; Acceleration current: 120 mA |
| | | Gas | $O_2$: 20 sccm |
| Third layer (hybrid layer) | Substance (content) | M1 CM2 | $SiO_2$ Epolight 70P: 10 sccm |
| | Film thickness/refractive index | | $0.6084\lambda/1.478$ |
| | Ion gun | Conditions | Acceleration voltage: 200 V; Acceleration current: 120 mA |
| | | Gas | $O_2$: 10 sccm + Ar: 10 sccm |

TABLE 2-3/5-continued

Example 3

| | | | |
|---|---|---|---|
| Fourth layer (high refractive index layer) | Substance Film thickness Ion gun | Ta$_2$O$_5$ 0.1358λ Conditions Gas | Acceleration voltage: 200 V; Acceleration current: 120 mA O$_2$: 20 sccm |
| Fifth layer (hybrid layer) | Substance (content) Film thickness/refractive index Ion gun | M1 CM2 0.0606λ/1.478 Conditions Gas | SiO$_2$ Epolight 70P: 10 sccm Acceleration voltage: 200 V; Acceleration current: 120 mA O$_2$: 10 sccm + Ar: 10 sccm |
| Sixth layer (high refractive index layer) | Substance Film thickness Ion gun | Ta$_2$O$_5$ 0.2520λ Conditions Gas | Acceleration voltage: 230 V; Acceleration current: 130 mA O$_2$: 20 sccm |
| Seventh layer (hybrid layer) | Substance (content) Film thickness/refractive index Ion gun | M1 CM2 0.2636λ/1.478 Conditions Gas | SiO$_2$ Epolight 70P: 10 sccm Acceleration voltage: 200 V; Acceleration current: 120 mA O$_2$: 10 sccm + Ar: 10 sccm |
| Ion gun pretreatment | Conditions Gas | Acceleration voltage: 200 V; Acceleration current: 120 mA; 45 s O$_2$: 5 sccm + Ar: 15 sccm | |
| Thin film (water-repellent antistatic layer) | Substance | Treating solution; EB heating | |

TABLE 2-4/5-continued

Example 4

| | | | |
|---|---|---|---|
| Fourth layer (high refractive index layer) | Substance Film thickness Ion gun | Ta$_2$O$_5$ 0.1358λ Conditions Gas | Acceleration voltage: 200 V; Acceleration current: 120 mA O$_2$: 20 sccm |
| Fifth layer (hybrid layer) | Substance (content) Film thickness/refractive index Ion gun | M1 CM2 0.0606λ/1.478 Conditions Gas | SiO$_2$ Epolight 70P: 10 sccm Acceleration voltage: 200 V; Acceleration current: 120 mA O$_2$: 10 sccm + Ar: 10 sccm |
| Sixth layer (high refractive index layer) | Substance Film thickness Ion gun | Ta$_2$O$_5$ 0.2520λ Conditions Gas | Acceleration voltage: 230 V; Acceleration current: 130 mA O$_2$: 20 sccm |
| Seventh layer (hybrid layer) | Substance (content) Film thickness/refractive index Ion gun | M1 CM2 0.2636λ/1.478 Conditions Gas | SiO$_2$ Epolight 70P: 10 sccm Acceleration voltage: 200 V; Acceleration current: 120 mA O$_2$: 10 sccm + Ar: 10 sccm |
| Ion gun pretreatment | Conditions Gas | Acceleration voltage: 200 V; Acceleration current: 120 mA; 45 s O$_2$: 5 sccm + Ar: 15 sccm | |
| Thin film (water-repellent antistatic layer) | Substance | Treating solution; EB heating | |

TABLE 2-4/5

Example 4

| | | | |
|---|---|---|---|
| Plastic lens substrate | | Substrate A | |
| Cured film | | Cured film A | |
| Ion gun pretreatment | Conditions Gas | Acceleration voltage: 500 V; Acceleration current: 180 mA; 45 s O$_2$: 10 sccm + Ar: 10 sccm | |
| Anti-reflection film | | | |
| First layer (hybrid layer) | Substance (content) Film thickness/refractive index Ion gun | M1 CM2 0.0352λ/1.478 Conditions Gas | SiO$_2$ Epolight 70P: 10 sccm Acceleration voltage: 200 V; Acceleration current: 120 mA O$_2$: 10 sccm + Ar: 10 sccm |
| Second layer (high refractive index layer) | Substance Film thickness Ion gun | Ta$_2$O$_5$ 0.0236λ Conditions Gas | Acceleration voltage: 200 V; Acceleration current: 120 mA O$_2$: 20 sccm |
| Third layer (hybrid layer) | Substance (content) Film thickness/refractive index Ion gun | M1 CM2 0.6084λ/1.478 Conditions Gas | SiO$_2$ Epolight 70P: 10 sccm Acceleration voltage: 200 V; Acceleration current: 120 mA O$_2$: 10 sccm + Ar: 10 sccm |

TABLE 2-5/5

Example 5

| | | | |
|---|---|---|---|
| Plastic lens substrate | | Substrate A | |
| Cured film | | Cured film A | |
| Ion gun pretreatment | Conditions Gas | Acceleration voltage: 500 V; Acceleration current: 180 mA; 45 s O$_2$: 10 sccm + Ar: 10 sccm | |
| Anti-reflection film | | | |
| First layer (hybrid layer) | Substance (content) Film thickness/refractive index Ion gun | M1 CM2 0.0352λ/1.478 Conditions Gas | SiO$_2$ Epolight 70P: 10 sccm Acceleration voltage: 200 V; Acceleration current: 120 mA O$_2$: 10 sccm + Ar: 10 sccm |
| Second layer (high refractive index layer) | Substance Film thickness Ion gun | Ta$_2$O$_5$ 0.0236λ Conditions Gas | Acceleration voltage: 200 V; Acceleration current: 120 mA O$_2$: 20 sccm |
| Third layer (hybrid layer) | Substance (content) Film thickness/refractive index Ion gun | M1 CM2 0.6084λ/1.478 Conditions Gas | SiO$_2$ Epolight 70P: 10 sccm Acceleration voltage: 200 V; Acceleration current: 120 mA O$_2$: 10 sccm + Ar: 10 sccm |

TABLE 2-5/5-continued

Example 5

| | | | |
|---|---|---|---|
| Fourth layer (high refractive index layer) | Substance Film thickness Ion gun | $Ta_2O_5$ 0.1358λ Conditions Gas | Acceleration voltage: 200 V; Acceleration current: 120 mA $O_2$: 20 sccm |
| Fifth layer (hybrid layer) | Substance (content) Film thickness/refractive index Ion gun | M1 CM2 0.0606λ/1.478 Conditions Gas | $SiO_2$ Epolight 70P: 10 sccm Acceleration voltage: 200 V; Acceleration current: 120 mA $O_2$: 10 sccm + Ar: 10 sccm |
| Sixth layer (high refractive index layer) | Substance Film thickness Ion gun | $Ta_2O_5$ 0.2520λ Conditions Gas | Acceleration voltage: 230 V; Acceleration current: 130 mA $O_2$: 20 sccm |
| Seventh layer (hybrid layer) | Substance (content) Film thickness/refractive index Ion gun | M1 CM2 0.2636λ/1.478 Conditions Gas | $SiO_2$ Epolight 70P: 10 sccm Acceleration voltage: 200 V; Acceleration current: 120 mA $O_2$: 10 sccm + Ar: 10 sccm |
| Ion gun pretreatment | Conditions Gas | Acceleration voltage: 200 V; Acceleration current: 120 mA; 45 s $O_2$: 5 sccm + Ar: 15 sccm | |
| Thin film (water-repellent antistatic layer) | Substance | Treating solution; EB heating | |

TABLE 3-1/4-continued

Comparative Example 1

| | | | |
|---|---|---|---|
| Fourth layer (high refractive index layer) | Substance Film thickness Ion gun | $Ta_2O_5$ 0.1358λ Conditions Gas | Acceleration voltage: 200 V; Acceleration current: 120 mA $O_2$: 20 sccm |
| Fifth layer (hybrid layer) | Substance (content) Film thickness/refractive index Ion gun | M1 CM2 0.0606λ/1.478 Conditions Gas | $SiO_2$ Epolight 70P: 14 sccm Acceleration voltage: 200 V; Acceleration current: 120 mA $O_2$: 10 sccm + Ar: 10 sccm |
| Sixth layer (high refractive index layer) | Substance Film thickness Ion gun | $Ta_2O_5$ 0.2520λ Conditions Gas | Acceleration voltage: 230 V; Acceleration current: 130 mA $O_2$: 20 sccm |
| Seventh layer (hybrid layer) | Substance (content) Film thickness/refractive index Ion gun | M1 CM2 0.2636λ/1.478 Conditions Gas | $SiO_2$ Epiol P200: 14 sccm Acceleration voltage: 200 V; Acceleration current: 120 mA $O_2$: 10 sccm + Ar: 10 sccm |
| Ion gun pretreatment | Conditions Gas | Acceleration voltage: 200 V; Acceleration current: 120 mA; 45 s $O_2$: 5 sccm + Ar: 15 sccm | |
| Water-repellent layer | Substance | KY-130 (or KP801M) | |

TABLE 3-1/4

Comparative Example 1

| | | | |
|---|---|---|---|
| Plastic lens substrate | | Substrate C | |
| Cured film | | Cured film B | |
| Ion gun pretreatment | Conditions Gas | Acceleration voltage: 500 V; Acceleration current: 180 mA; 45 s $O_2$: 10 sccm + Ar: 10 sccm | |
| Anti-reflection film | | | |
| First layer (hybrid layer) | Substance (content) Film thickness/refractive index Ion gun | M1 CM2 0.0352λ/1.478 Conditions Gas | $SiO_2$ Epolight 70P: 14 sccm Acceleration voltage: 200 V; Acceleration current: 120 mA $O_2$: 10 sccm + Ar: 10 sccm |
| Second layer (high refractive index layer) | Substance Film thickness Ion gun | $Ta_2O_5$ 0.0236λ Conditions Gas | Acceleration voltage: 200 V; Acceleration current: 120 mA $O_2$: 20 sccm |
| Third layer (hybrid layer) | Substance (content) Film thickness/refractive index Ion gun | M1 CM2 0.6084λ/1.478 Conditions Gas | $SiO_2$ Epolight 70P: 14 sccm Acceleration voltage: 200 V; Acceleration current: 120 mA $O_2$: 10 sccm + Ar: 10 sccm |

TABLE 3-2/4

Comparative Example 2

| | | | |
|---|---|---|---|
| Plastic lens substrate | | Substrate C | |
| Cured film | | Cured film B | |
| Ion gun pretreatment | Conditions Gas | Acceleration voltage: 500 V; Acceleration current: 180 mA; 45 s $O_2$: 10 sccm + Ar: 10 sccm | |
| Anti-reflection film | | | |
| First layer (hybrid layer) | Substance (content) Film thickness/refractive index Ion gun | M1 CM2 0.0352λ/1.478 Conditions Gas | $SiO_2$ Epolight 70P: 14 sccm Acceleration voltage: 400 V; Acceleration current: 170 mA $O_2$: 10 sccm + Ar: 10 sccm |
| Second layer (high refractive index layer) | Substance Film thickness Ion gun | $Ta_2O_5$ 0.0236λ Conditions Gas | Acceleration voltage: 200 V; Acceleration current: 120 mA $O_2$: 20 sccm |
| Third layer (hybrid layer) | Substance (content) Film thickness/refractive index Ion gun | M1 CM2 0.6084λ/1.471 Conditions Gas | $SiO_2 + Al_2O_3$ Epolight 70P: 14 sccm Acceleration voltage: 400 V; Acceleration current: 170 mA $O_2$: 10 sccm + Ar: 10 sccm |

TABLE 3-2/4-continued

Comparative Example 2

| | | | |
|---|---|---|---|
| Fourth layer (high refractive index layer) | Substance<br>Film thickness<br>Ion gun | $Ta_2O_5$<br>$0.1358\lambda$<br>Conditions | Acceleration voltage: 200 V; Acceleration current: 120 mA |
| | | Gas | $O_2$: 20 sccm |
| Fifth layer (hybrid layer) | Substance (content)<br>CM2<br>Film thickness/refractive index | M1<br>CM2 | $SiO_2$<br>Epolight 70P: 14 sccm<br>$0.0606\lambda/1.478$ |
| | Ion gun | Conditions | Acceleration voltage: 400 V; Acceleration current: 170 mA |
| | | Gas | $O_2$: 10 sccm + Ar: 10 sccm |
| Sixth layer (high refractive index layer) | Substance<br>Film thickness<br>Ion gun | $Ta_2O_5$<br>$0.2520\lambda$<br>Conditions | Acceleration voltage: 230 V; Acceleration current: 130 mA |
| | | Gas used | $O_2$: 20 sccm |
| Seventh layer (hybrid layer) | Substance (content)<br>CM2<br>Film thickness/refractive index | M1<br>CM2 | $SiO_2$<br>Epolight 70P: 14 sccm<br>$0.2636\lambda/1.478$ |
| | Ion gun | Conditions | Acceleration voltage: 400 V; Acceleration current: 170 mA |
| | | Gas | $O_2$: 10 sccm + Ar: 10 sccm |
| Ion gun pretreatment | Conditions<br>Gas | Acceleration voltage: 200 V; Acceleration current: 120 mA; 45 s<br>$O_2$: 5 sccm + Ar: 15 sccm | |
| Water-repellent layer | Substance | KY-130 (or KP801M) | |

TABLE 3-3/4

Comparative Example 3

| | | | |
|---|---|---|---|
| Plastic lens substrate | | Substrate C | |
| Cured film | | Cured film B | |
| Ion gun pretreatment | Conditions<br>Gas | Acceleration voltage: 500 V; Acceleration current: 180 mA; 45 s<br>$O_2$: 10 sccm + Ar: 10 sccm | |
| Anti-reflection film | | | |
| First layer (hybrid layer) | Substance (content)<br>CM2<br>Film thickness/refractive index | M1<br>CM2 | $SiO_2$<br>Epolight 70P: 14 sccm<br>$0.0352\lambda/1.478$ |
| | Ion gun | Conditions | Acceleration voltage: 200 V; Acceleration current: 120 mA |
| | | Gas | $O_2$: 10 sccm + Ar: 10 sccm |
| Second layer (high refractive index layer) | Substance<br>Film thickness<br>Ion gun | $Ta_2O_5$<br>$0.0236\lambda$<br>Conditions | Acceleration voltage: 200 V; Acceleration current: 120 mA |
| | | Gas | $O_2$: 20 sccm |
| Third layer (hybrid layer) | Substance (content)<br>CM2<br>Film thickness/refractive index | M1<br>CM2 | $SiO_2$<br>Epolight 70P: 14 sccm<br>$0.6084\lambda/1.478$ |
| | Ion gun | Conditions | Acceleration voltage: 200 V; Acceleration current: 120 mA |
| | | Gas | $O_2$: 10 sccm + Ar: 10 sccm |

TABLE 3-3/4-continued

Comparative Example 3

| | | | |
|---|---|---|---|
| Fourth layer (high refractive index layer) | Substance<br>Film thickness<br>Ion gun | $Ta_2O_5$<br>$0.1358\lambda$<br>Conditions | Acceleration voltage: 200 V; Acceleration current: 120 mA |
| | | Gas | $O_2$: 20 sccm |
| Fifth layer (hybrid layer) | Substance (content)<br>CM2<br>Film thickness/refractive index | M1<br>CM2 | $SiO_2$<br>Epolight 70P: 14 sccm<br>$0.0606\lambda/1.478$ |
| | Ion gun | Conditions | Acceleration voltage: 200 V; Acceleration current: 120 mA |
| | | Gas | $O_2$: 10 sccm + Ar: 10 sccm |
| Sixth layer (high refractive index layer) | Substance<br>Film thickness<br>Ion gun | $Ta_2O_5$<br>$0.2520\lambda$<br>Conditions | Acceleration voltage: 230 V; Acceleration current: 130 mA |
| | | Gas | $O_2$: 20 sccm |
| Seventh layer (hybrid layer) | Substance (content)<br>CM2<br>Film thickness/refractive index | M1<br>CM2 | $SiO_2$<br>Epolight 70P: 14 sccm<br>$0.2636\lambda/1.478$ |
| | Ion gun | Conditions | Acceleration voltage: 200 V; Acceleration current: 120 mA |
| | | Gas | $O_2$: 10 sccm + Ar: 10 sccm |
| Ion gun for pretreatment | Conditions<br>Gas | Acceleration voltage: 200 V; Acceleration current: 120 mA; 45 s<br>$O_2$: 5 sccm + Ar: 15 sccm | |
| Water-repellent layer | Substance | KY-130; Dotite D-550; dipped product obtained by dipping in 10 wt % butyl acetate diluted solution for 30 s. | |

TABLE 3-4/4

Comparative Example 4

| | | | |
|---|---|---|---|
| Plastic lens substrate | | Substrate C | |
| Cured film | | Cured film B | |
| Ion gun pretreatment | Conditions<br>Gas | Acceleration voltage: 500 V; Acceleration current: 180 mA; 45 s<br>$O_2$: 10 sccm + Ar: 10 sccm | |
| Anti-reflection film | | | |
| First layer (hybrid layer) | Substance (content)<br>CM2<br>Film thickness/refractive index | M1<br>CM2 | $SiO_2$<br>Epolight 70P: 14 sccm<br>$0.0352\lambda/1.478$ |
| | Ion gun | Conditions | Acceleration voltage: 200 V; Acceleration current: 120 mA |
| | | Gas | $O_2$: 10 sccm + Ar: 10 sccm |
| Second layer (high refractive index layer) | Substance<br>Film thickness<br>Ion gun | $Ta_2O_5$<br>$0.0236\lambda$<br>Conditions | Acceleration voltage: 200 V; Acceleration current: 120 mA |
| | | Gas | $O_2$: 20 sccm |
| Third layer (hybrid layer) | Substance (content)<br>CM2<br>Film thickness/refractive index | M1<br>CM2 | $SiO_2$<br>Epolight 70P: 14 sccm<br>$0.6084\lambda/1.478$ |
| | Ion gun | Conditions | Acceleration voltage: 200 V; Acceleration current: 120 mA |
| | | Gas | $O_2$: 10 sccm + Ar: 10 sccm |

TABLE 3-4/4-continued

Comparative Example 4

| | | | |
|---|---|---|---|
| Fourth layer (high refractive index layer) | Substance Film thickness Ion gun | Ta₂O₅ 0.1358λ Conditions Gas | Acceleration voltage: 200 V; Acceleration current: 120 mA O₂: 20 sccm |
| Fifth layer (hybrid layer) | Substance (content) Film thickness/refractive index Ion gun | M1 CM2 SiO₂ Epolight 70P: 14 sccm 0.0606λ/1.478 Conditions Gas | Acceleration voltage: 200 V; Acceleration current: 120 mA O₂: 10 sccm + Ar: 10 sccm |
| Sixth layer (high refractive index layer) | Substance Film thickness Ion gun | Ta₂O₅ 0.2520λ Conditions Gas | Acceleration voltage: 230 V; Acceleration current: 130 mA O₂: 20 sccm |
| Seventh layer (hybrid layer) | Substance (content) Film thickness/refractive index Ion gun | M1 CM2 SiO₂ Epolight 70P: 14 sccm 0.2636λ/1.478 Conditions Gas | Acceleration voltage: 200 V; Acceleration current: 120 mA O₂: 10 sccm + Ar: 10 sccm |
| Ion gun pretreatment | Conditions Gas | Acceleration voltage: 200 V; Acceleration current: 120 mA; 45 s O₂: 5 sccm + Ar: 15 sccm | |
| Water-repellent layer | Substance | KY-130; Dotite XC-12; dipped product obtained by dipping in 10 wt % butyl acetate diluted solution for 30 s. | |

TABLE 4-1/2

| | Examples | | | | |
|---|---|---|---|---|---|
| | 1 | 2 | 3 | 4 | 5 |
| Luminous transmittance Y (%) | 0.82 | 0.82 | 0.82 | 0.98 | 0.82 |
| Luminous transmittance Z (%) | 99.0 | 99.0 | 99.0 | 99.0 | 99.0 |
| Impact resistance | CT = 1.0 FDA: A | CT = 1.0 FDA: A | CT = 1.0 FDA: A | CT = 2.0 FDA: A | CT = 1.0 FDA: A |
| Adhesion property | 100/100 | 100/100 | 100/100 | 100/100 | 100/100 |
| Abrasion resistance | UA | UA | UA | UA | UA |
| Heat resistance (° C.) | 105 | 85 | 120 | 60 | 85 |
| Alkali resistance | UA | UA | UA | UA | UA |
| Bayer value | 12.0 | 12.0 | 12.5 | 12.0 | 12.0 |
| Initial static voltage (V) | 200 | 220 | 200 | 180 | 220 |
| 1/a Reduction period (s) | 20 | 20 | 30 | 30 | 20 |
| Conductivity of treating solution (MΩ) | 1 to 5 | 1 to 5 | 1 to 5 | 1 to 5 | 1 to 5 |
| Water repellency (water contact angle (°)) | 108 | 107 | 108 | 108 | 108 |

TABLE 4-2/2

| | Comparative Examples | | | |
|---|---|---|---|---|
| | 1 | 2 | 3 | 4 |
| Luminous transmittance Y (%) | 0.82 | 0.82 | 0.82 | 0.82 |
| Luminous transmittance Z (%) | 99.0 | 99.0 | 99.0 | 99.0 |
| Impact resistance | CT = 1.0 FDA: A | CT = 1.0 FDA: A | CT = 1.0 FDA: A | CT = 1.0 FDA: A |
| Adhesion property | 100/100 | 100/100 | 100/100 | 100/100 |
| Abrasion resistance | UA | UA | UA | UA |
| Heat resistance (° C.) | 105 | 105 | 105 | 105 |
| Alkali resistance | UA | UA | UA | UA |
| Bayer value | 12.0 | 12.0 | 12.0 | 12.0 |
| Initial static voltage (V) | 2000 | 2000 | 2000 | 2000 |
| 1/a Reduction period (s) | 300 | 300 | 300 | 300 |
| Conductivity of treating solution (MΩ) | ∞ | ∞ | ∞ 10% diluted solution | ∞ 10% diluted solution |
| Water repellency (water contact angle (°)) | 108 | 107 | 107 | 108 |

INDUSTRIAL APPLICABILITY

As described above, according to the process of the present invention, a thin film and an optical member which are free from discoloration of lens and exhibit a good antistatic property and a good water repellency are obtained. Therefore, the obtained optical member is extremely useful as a plastic lens, etc.

What is claimed is:

1. A process for producing a thin film, comprising:
subjecting a water repellent solution to a vacuum deposition method to form the thin film, the water repellent solution being a mixture of (a) a water repellent having a perfluoroalkyl group, (b) a mixture of an aminopropyltrialkoxysilane, an epoxy-modified silicone oil introduced with an epoxy group into its side chain and/or both terminal ends, and a perfluoroether compound selected from the group consisting of perfluorobutyl ether, methyl perfluorobutyl ether, butyl perfluoromethyl ether and propyl perfluoroethyl ether, and (c) at least one conductive substance selected from the group consisting of fullerenes, carbon nanotubes and graphite compounds respectively having a particle size of 80 μm or less;

wherein, a content of (b) in the water repellent solution is in the range of 18.5 to 50% by weight on the basis of the total weight of (a), (b) and (c), a weight ratio of (b) to (a) is in the range of 0.7 to 1.1, a weight ratio of the aminopropyltrialkoxysilane and the epoxy-modified silicone oil is in the range of 1:3 to 3:1, and an amount of the perfluoroether compound is in the range of 0.1 to 0.8 part by weight per 1 part by weight of the sum of the aminopropyltrialkoxysilane and the epoxy-modified silicone oil.

2. The process according to claim 1, wherein the fullerene, the carbon nanotube and the graphite compound respectively have a particle size of 20 to 50 μm.

3. The process according to claim 1, wherein content of the component (a) in the water repellent solution is 30 to 90% by weight on the basis of the total weight of the components (a), (b) and (c).

4. The process according to claim 3, wherein content of the component (c) in the water repellent solution is 0.5 to 30% by weight.

5. The process according to claim 1, wherein the aminopropyltrialkoxysilane is aminopropyltrimethoxysilane or aminopropyltriethoxysilane.

6. The process according to claim 1, wherein the vacuum deposition method vapor-deposits the water-repellent solution on a substrate to form said thin film.

7. The process according to claim 1, wherein the fullerene is at least one compound selected from the group consisting of compounds having a $C_z$ spherical structure wherein z is an integer of from 40 to 120.

8. The process according to claim 1, wherein the fullerene is at least one compound selected from the group consisting of compounds having a $C_{60}$ and $C_{72}$ spherical structure.

9. The process according to claim 1, wherein the carbon nanotube is at least one compound selected from the group consisting of a multi-walled carbon nanotube and a single-walled carbon nanotube.

10. The process according to claim 1 wherein the graphite compound is at least one compound selected from the group consisting of carbon graphite, fluorinated graphite and expanded graphite.

11. The process according to claim 1, wherein the fullerene, the carbon nanotube and the graphite compound respectively have a particle size of 20-80 μm.

12. The process according to claim 1, wherein the water repellent solution is impregnated into a sintered filter made of a porous material, and the thin film is formed by heating the sintered filter in vacuum.

13. A process for producing a thin film, comprising:
subjecting a water repellent solution to a vacuum deposition method to form the thin film, the water repellent solution being a mixture of (a) a water repellent having a perfluoroalkyl group, (b) a mixture of an aminopropyltrialkoxysilane, an epoxy-modified silicone oil introduced with an epoxy group into its side chain and/or both terminal ends, and a perfluoroether compound selected from the group consisting of perfluorobutyl ether, methyl perfluorobutyl ether, butyl perfluoromethyl ether and propyl perfluoroethyl ether, and (c) at least one conductive substance selected from the group consisting of fullerenes, carbon nanotubes and graphite compounds respectively having a particle size of 80 μm or less;
wherein, a content of (b) in the water repellent solution is in the range of 18.5 to 50% by weight on the basis of the total weight of (a), (b) and (c), a weight ratio of (b) to (a) is in the range of 0.7 to 1.1, a weight ratio of the aminopropyltrialkoxysilane and the epoxy-modified silicone oil is in the range of 1:3 to 3:1, and an amount of the perfluoroether compound is in the range of 0.1 to 0.8 part by weight per 1 part by weight of the sum of the aminopropyltrialkoxysilane and the epoxy-modified silicone oil, and
including the further step of mixing the components (a), (b) and (c) so as to form said water repellent solution subjected to said vacuum deposition method to form the thin film.

* * * * *